United States Patent
Shah et al.

(10) Patent No.: US 9,455,563 B2
(45) Date of Patent: Sep. 27, 2016

(54) DIP SWITCH CHANGE DETECTION IN A SELF POWERED RELAY

(71) Applicant: ABB TECHNOLOGY LTD, Zürich (CH)

(72) Inventors: Vijay Shah, Gujarat (IN); Indresh Bhatia, Gujarat (IN); Sohal Patel, Gujarat (IN); Vishal H. Shah, Gujarat (IN)

(73) Assignee: ABB Schweiz AG, Baden (CH)

(*) Notice: Subject to any disclaimer, the term of this patent is extended or adjusted under 35 U.S.C. 154(b) by 729 days.

(21) Appl. No.: 13/854,303

(22) Filed: Apr. 1, 2013

(65) Prior Publication Data

US 2013/0222966 A1    Aug. 29, 2013

Related U.S. Application Data

(63) Continuation of application No. PCT/IB2011/002301, filed on Sep. 30, 2011.

(30) Foreign Application Priority Data

Oct. 1, 2010   (IN) ............................ 2912/CHE/2010

(51) Int. Cl.
*H02H 3/00* (2006.01)
*H01H 9/16* (2006.01)
*H01H 71/12* (2006.01)
*H01H 71/00* (2006.01)

(52) U.S. Cl.
CPC ............ *H02H 3/006* (2013.01); *H01H 9/167* (2013.01); *H01H 71/123* (2013.01); *H01H 2071/006* (2013.01); *H01H 2300/03* (2013.01); *Y02B 90/224* (2013.01); *Y04S 20/14* (2013.01)

(58) Field of Classification Search
CPC . H02H 3/006; H01H 2071/006; Y04S 20/14

USPC ............................................ 307/131
See application file for complete search history.

(56) References Cited

U.S. PATENT DOCUMENTS

| 6,967,589 B1* | 11/2005 | Peters ................. E21B 47/00 166/250.15 |
| 2001/0014840 A1* | 8/2001 | Marshall ............ G05D 7/0676 700/266 |
| 2010/0296221 A1 | 11/2010 | Shah et al. |
| 2011/0186408 A1 | 8/2011 | Manzoli et al. |

FOREIGN PATENT DOCUMENTS

| EP | 0 807 874 A2 | 11/1997 |
| WO | WO 2009/071454 A1 | 6/2009 |
| WO | WO 2010/026013 A1 | 3/2010 |

OTHER PUBLICATIONS

International Search Report (PCT/ISA/210) issued on Jan. 30, 2012, by the Indian Patent Office as the International Searching Authority for International Application No. PCT/IB2011/002301.

* cited by examiner

*Primary Examiner* — Scott Bauer
(74) *Attorney, Agent, or Firm* — Barnes & Thornburg LLP

(57) ABSTRACT

An interface is disclosed for a self powered protection relay that uses mechanical switches for its configuration. The protection relay can include a base relay for measurement of line current and for generation of a trip signal, and a Human Machine Interface (HMI) unit for specifying, by a user, a base setting of an operating parameter of the protection relay. The base relay can be self-powered from the line and the HMI unit can include an auxiliary power supply. The protection relay is configured with mechanical switches provided in the protection relay. The HMI unit in the protection relay is designed to detect and alert the user of the relay of any change in the base setting carried out with one or more mechanical switches provided in the relay in powered and unpowered conditions of the base relay.

19 Claims, 2 Drawing Sheets

DIP SWITCH CHANGE DETECTION IN A SELF POWERED RELAY

RELATED APPLICATION

This application claims priority as a continuation application under 35 U.S.C. §120 to PCT/IB/2011/002301, which was filed as an International Application on Sep. 30, 2011 designating the U.S., and which claims priority to Indian Application 2912/CHE/2010 filed in India on Oct. 1, 2010. The entire contents of these applications are hereby incorporated by reference in their entireties.

FIELD

The present disclosure relates to the field of electrical power distribution, and for example, to an interface for a self powered protection relay that can use mechanical switches for its configuration.

BACKGROUND

A protection relay is a microcontroller based intelligent electronic device with a basic function to protect electrical equipment by tripping a circuit breaker and interrupting a power line in case of over current or earth fault situations. The tripping signal on behalf of a trip coil or other actuator of the circuit breaker is generated by the protection relay when, for example, the measured current in the line exceeds a nominal or preset value for a predefined time period. In certain situations such as Ring Main Units (RMU) installations in urban areas, a self-supplied relay may be used. The self-supplied protection relay utilizes energy from the current sensing transformers to supply to the relay electronics circuit and the energy to operate trip coils. A self-supplied relay may be customized by an user through mechanical binary or Dual In-line Package (DIP) switches for parameter setting, or alternatively through battery-power alphanumeric LCD based Human Machine Interfaces (HMI). The HMI may be a detachable component as disclosed in the WIPO publication WO2009071454.

The dip switches based HMI can have limited functionality (e.g., restricted to binary combinations achievable for given dip positions), apart from the constraints that a user has to do for decoding the switch position through a table to understand the interpretation of switch positions with respect to functionality being configured. An HMI such as using push buttons or touch screen interface enhances the primary function of the product through an interactive user interface by displaying the various parameters of the relay including the line current measurements, protection settings, Event logs, etc. Such HMI can also facilitate fine tuning of the achievable settings through given DIP combinations.

In case of a self powered relay, the following parameters as an example may be set with the help of DIP switches settings:
1. Nominal Current Is
2. Low set over current & earth fault protection stage
   i. Setting range of pickup current 'I>', 'Io>'
   ii. Setting range of definite time delay 't>', 'to>'
   iii. Setting of inverse time characteristics 'CI', 'CE'
   iv. Setting range of time multiplier 'K', 'Ko'
3. High set phase over current & earth fault protection stage
   i. Setting range of pickup current 'I>>', 'Io>>'
   ii. Setting range of definite time delay 't>>', 'to>>'
4. Earth fault measurement: Internal/External
5. HMI: Enabled/Disabled The HMI provides fine settings to setting done by DIP. For example by DIP t> is set to 0.05 & next possible setting by DIP is 0.07. In this case with the help of HMI t> can be set to 0.06 by applying fine setting value of 0.01.

In relays, the DIP positions can, for example, only be used internally for further processing. In self powered relays mechanical switches like a DIP or resistive potentiometers have been used to permit the settings of relay even in unpowered condition, in the most easiest and cost effective way. The settings and changes done by DIP are sensed by relay & then used internally for further processing. In this whole process normally there is no feedback to user, that whether changes are sensed properly or not. Further, DIPs are mechanical switches, which can be prone to changes in case of both powered and unpowered situation. So there are possibilities of tampering of settings when the relay is OFF. Therefore, it would be desirable to have feedback on the DIP switch settings and any change made in the setting in the powered and unpowered situation.

SUMMARY

A protection relay is disclosed for providing electrical protection in an electrical system, comprising: a base relay for measurement of line current in a medium voltage power line and for generation of a trip signal; a plurality of mechanical switches for specifying, by a user, a base setting of an operating parameter of the protection relay; and a Human Machine Interface (HMI) unit for detecting at least one change in the base setting made with at least one mechanical switch from among the plurality of mechanical switches of the protection relay.

BRIEF DESCRIPTION OF THE DRAWINGS

Other features and advantages will become apparent to those skilled in the art upon reading the description of the preferred exemplary embodiments in conjunction with the accompanying drawings, wherein.

DETAILED DESCRIPTION

Figure 1:
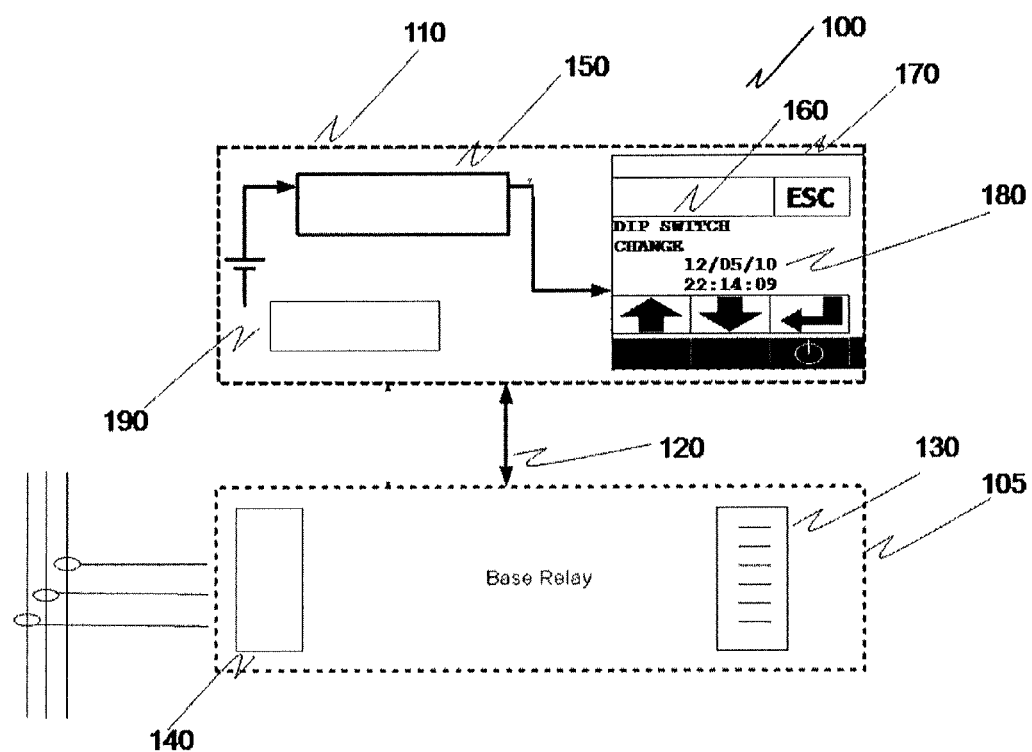
FIG. 1 is a protection relay as per an exemplary embodiment disclosed herein.

A protection relay specifically is disclosed, such as a self powered relay, to detect a change in DIP switches in powered and unpowered situations and improve interaction with the user of the protection relay.

As disclosed herein, a fully operational digital protection relay or Intelligent Electronic Device (IED) using mechanical switches (DIP switches) for base setting related to operations of the protection relay is provided. The protection relay has a base relay that receives power using the line current that it functions to measure and a Human Machine Interface (HMI) unit. The HMI reports change in DIP switches when one or multiple DIP switches are operated. The HMI unit is provided with an auxiliary power supply to have the change in the DIP switch detected even when the base relay is in the power less state due to trip (no supply of power from the line).

According to an exemplary embodiment, the HMI unit generates an alert whenever the protection relay has a change in the DIP switches. The alert indicates the DIP switch (specific relay setting) that has undergone a change along with a time stamp indicating the time when the change was made. In case of multiple changes, the user has to navigate using the HMI to discover the sequence of the change. The user may acknowledge the change made with the DIP switches and in another embodiment, the setting may take affect only after the change is acknowledged.

In yet another exemplary embodiment, the change in the DIP switch setting is made at an unpowered condition of the base relay and the HMI unit detects the change and records the change in its memory. The protection relay performs periodic scans (e.g., via an on-board controller) to detect any change in the DIP switch settings.

In yet another exemplary embodiment, the change in the DIP switch setting is detected and displayed during the power ON state of the protection relay. The change is detected if there is a change in the DIP switch settings in comparison with the DIP switch settings stored as a record in the protection relay.

A relay with DIP switches is disclosed, in which any change in the DIP switches can be acknowledged in the Human Machine Interface (HMI) of the relay. This can be very significant in self powered relay where dip or rotator kind of switches have been used to permit the settings, changes in an unpowered condition.

The DIP switches of the Base relay can be the most easiest and cost effective way to set the self powered relay configuration and settings. The DIP switches can be set according to the specified configuration after relay is powered off. The changes done can be recorded and stored for future reference and diagnostics in an exemplary embodiment.

The information on the change in DIP switch can be useful for:—
a) Visual check of the changes in settings
b) Verification of correct DIP changes and thereby also preventing accidental shifts through notifications
c) Fault diagnostics The functioning of the DIP switch change detection is explained in accordance with an exemplary embodiment. In this embodiment, the relay is said to comprise: a) a base relay having the dip switch and providing the protection function; and b) an optional human machine interface (HMI) unit providing an interface for the operator to configure the relay using the HMI and also view the settings and parameters related to the relay through the HMI. The HMI acts both as an input and display device for the protection relay. In self powered relay, the HMI is provided with a battery backup.

The user can change the DIP switches anytime during the operation of the Self powered relay. The relay can be either powered on or off.

The switch information is monitored periodically when the relay is ON. The switch information is also compared on each power on time. Thus when the relay is OFF, and the user changes the switch, on the next turn ON of the relay, there is a difference in the stored information of DIP and the new DIP positions. The difference triggers an alert and is recorded with timestamp. In case the user accidently changes the relay DIP settings during the time the relay is ON, the difference in the information change can be immediately notified, and can trigger an alert, and can be recorded with timestamp.

FIG. 1 provides an exemplary system block diagram for a protection relay 100. The block diagram includes (e.g., consists of) a base relay 105, a HMI unit 110, interface 120 for power and communication, DIP switches (or any mechanical switch) 130, power supply 140 for the protection relay and auxiliary power supply 150 for the HMI unit. The user is intimated with the change in DIP switches with an alert on the HMI screen. The alert (160) is flashed in the HMI screen (170) as soon as the relay powers up and/or changes in the configuration are identified. The alert carries a time stamp (180) of the recorded change.

Figure 2:
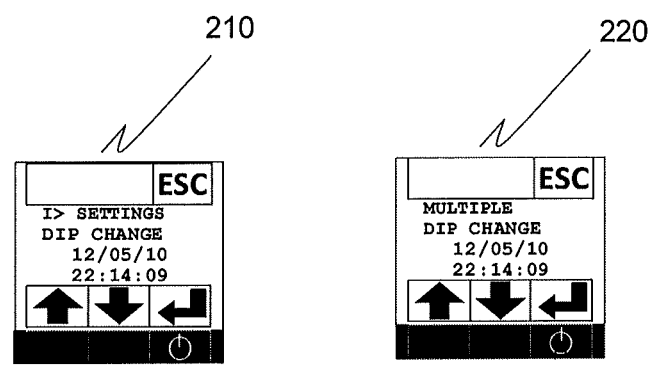
FIG. 2 illustrates exemplary alerts on an HMI screen of a protection relay as per an exemplary embodiment disclosed herein.

Further, in an exemplary embodiment, the relay is configured to store the DIP changes with other associated details (E.g. time stamp) in its records database or memory (190) and to display the alerts on the HMI screen. FIG. 2 depicts an example of the alert when a change in a specific configuration, here in the example, pick up current setting range (210) is being caused with a single DIP switch change and also an example of the alert when multiple change (220) in the DIP switch settings have been caused.

The DIP switch change detection can be made whenever the relay is powered ON, by having the current status of DIP position communicated to the HMI and by having the DIP position communicated on every periodic scan (e.g., a scan by a dedicated, specially programmed processor of the HMI). The communicated DIP position status is then compared with last status stored in a non-volatile memory of the HMI. In case any difference in position found during comparison, a DIP change alert with time stamp in the form of message generated & stored in non volatile memory. This way any change is detected.

As an example, the change detection, further allows the following to be evaluated and/or performed:
1. Along with DIP change, which DIPs are changed with time stamp information, will also be generated and will be displayed in graphical form.
2. A set of records of last few instances when settings were changed will be generated by storing "which setting is changed" information along with time stamp in non-volatile memory & will be presented in the form of a trend of settings change which will be useful for diagnosis or knowing the pattern of settings change.
3. Graphically representing the DIP positions and then any change in DIP positions will be highlighted to end user by any means like blinking of those changed DIPs only.
4. Will indicate whether there is a single change of DIP or there are multiple changes of DIP position with time stamp graphically.
5. The DIP changes when relay is OFF & HMI is On is detected since HMI has a battery backup. The HMI unit has interface to the base relay to scan DIP switch settings and detect any change in the settings.
6. The change in DIP switch status information is communicated to remote location for further analysis.

As a use case, even when settings were changed when relay is turned off, a user will have intimation of a DIP changed on the HMI during next power on, which is very useful during diagnosis to know that whether knowingly (including tampering) or unknowingly settings were changed. Apart from this it also can act as an acknowledgement to the user that change is in effect on the relay. The relay, as an example, is enabled to activate a change in setting only when it is acknowledged by the user.

A time stamp can be very useful in knowing the time instance when the setting is changed. With help of this one can judge when settings were changed & can be used to judge behavior of relay before & after change of DIP switches.

A known way to stamp data is through a "Real Time Clock" or RTC chip available for embedded systems. There are also instances where the timer in the Microprocessor can do a similar job. Moreover high end systems employ SNTP or similar protocol over internet to synchronize time. An exemplary embodiment as disclosed herein can use a RTC embedded on the microcontroller to time stamp the event of change of DIP switch.

The RTC can be battery backed and work independently from the Microcontroller. The time is set by the user with the help of GUI. This time count is retained until the RTC is powered by the battery. In case of the fresh RTC powered up for the first time, the RTC starts from any random time. This time is considered invalid and User is prompted to set an appropriate time. Meanwhile any activity or events that are time stamped have their stamping as 00/00/0000 as date month and year and 00:00:00 as the hours minutes and seconds. If the DIP switch is changed during the relay being off, the timestamp will be done by the HMI when the relay is turned ON.

Here the HMI can be a separate module where by means of communication DIP information can be sent to the HMI & displayed. And thereby the user is able to know what he has set & what is really read by the device.

The information available is a DIP change with time stamp. This information is stored in a non volatile memory and can be updated on every next dip change provided relay is powered. Even this information is available on next power on. The feature can be helpful in cases of analyzing the cause of an unexpected trip, by knowing when last settings were changed before trip instance. This way it may help to identify that due to some setting change a wrong trip occurred.

Also in another case, since the relay is self powered, after the clearance of fault, where a relay will be turned off, in such situation if required to restore the whole system with the persisting fault condition, relay settings will be modified to higher values. Else, if an attempt is made to restore without modifying relay settings when it is off, there will continuously be a trip due to a persisting fault condition and this could affect associated diagnostics.

Thus, with the help of various examples and use cases, exemplary advantages to have feedback on the DIP switch settings and any changes made in the setting in the powered and unpowered situations in a self powered relay are illustrated.

While only certain features of the invention have been illustrated and described herein, many modifications and changes will occur to those skilled in the art. It is, therefore, to be understood that the appended claims are intended to cover all such modifications and changes as fall within the true spirit of the invention.

Thus, It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claims:

1. A protection relay for providing electrical protection in an electrical system, comprising:
    a base relay for measurement of line current in a medium voltage power line and for generation of a trip signal;
    a plurality of mechanical switches for specifying, by a user, a base setting of an operating parameter of the base relay;
    a Human Machine Interface (HMI) unit for detecting at least one change in the base setting made with at least one mechanical switch from among the plurality of mechanical switches of the protection relay,
    wherein the HMI unit detects the at least one change in the base setting made with the at least one mechanical switch at an unpowered condition of the base relay.

2. The protection relay according to claim 1, wherein the base relay includes a power supply module adapted to receive power from the medium voltage power line.

3. The protection relay according to claim 1, wherein, the HMI unit is provided with an auxiliary power supply for supplying power to the HMI unit.

4. The protection relay according to claim 1, wherein the HMI unit records a change in the base setting made with at least one mechanical switch from the plurality of mechanical switches along with a time stamp information for every change made in the base setting of the protection relay.

5. The protection relay according to claim 4, wherein the HMI unit is configured to record a change in the base setting made with at least one mechanical switch from the plurality of mechanical switches at an unpowered condition of the base relay.

6. The protection relay according to claim 1, wherein the HMI unit comprises:
    a display for displaying the change in the base setting made with at least one mechanical switch from the plurality of mechanical switches.

7. The protection relay according to claim 6, wherein the HMI unit is adapted to receive an acknowledgment from the user for a change in the base setting made with at least one mechanical switch from the plurality of mechanical switches.

8. The protection relay according to claim 6, wherein the HMI unit display is configured to display the change in the base setting made with at least one mechanical switch from the plurality of mechanical switches on Power ON of the protection base relay.

9. The protection relay according to claim 1, wherein the mechanical switch is a Dual In-Line Package (DIP) switch.

10. The protection relay according to claim 1, wherein the change in the base setting made with at least one mechanical switch from the plurality of mechanical switches is detected through a periodic scan by the HMI unit.

11. The protection relay according to claim 2, comprising:
    an auxiliary power supply for supplying power to the HMI unit.

12. The protection relay according to claim 11, wherein the HMI unit records a change in the base setting made with at least one mechanical switch from the plurality of mechanical switches along with a time stamp information for every change made in the base setting of the protection relay.

13. The protection relay according to claim 12, wherein the HMI unit comprises:
    a display for displaying the change in the base setting made with at least one mechanical switch from the plurality of mechanical switches.

14. The protection relay according to claim 13, wherein the mechanical switch is a Dual In-Line Package (DIP) switch.

15. The protection relay according to claim 14, wherein the change in the base setting made with at least one mechanical switch from the plurality of mechanical switches is detected through a periodic scan by the HMI unit.

16. The protection relay according to claim 1, wherein the HMI unit has an interface to the base relay to scan at least one mechanical switch setting and detect any change in the at least one mechanical switch settings.

17. The protection relay according to claim 7, wherein the change in the base setting made with the at least one mechanical switch from the plurality of mechanical switches are activated upon receiving the acknowledgement from the user.

18. The protection relay according to claim 1, wherein the HMI unit includes a processor and a memory to perform a scan to detect a position of at least one mechanical switch and to store the position of the at least one mechanical switch in the memory.

19. The protection relay according to claim 18, wherein the HMI unit generates an alert along with a time stamp on detection of a difference in a scanned position of at least one mechanical switch with a last stored position of the at least one mechanical switch.

* * * * *